(12) United States Patent
Gekeler et al.

(10) Patent No.: US 10,108,327 B2
(45) Date of Patent: Oct. 23, 2018

(54) METHOD AND DEVICE FOR DETERMINING AN INTERVAL VIA A GRAPHICAL USER INTERFACE

(71) Applicant: Robert Bosch GmbH, Stuttgart (DE)

(72) Inventors: Matthias Gekeler, Stuttgart (DE); Boris Ruoff, Kirchheim Unter Teck (DE); Jochen Knoedler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 15/139,495

(22) Filed: Apr. 27, 2016

(65) Prior Publication Data

US 2016/0328135 A1 Nov. 10, 2016

(30) Foreign Application Priority Data

May 8, 2015 (DE) .................. 10 2015 208 578

(51) Int. Cl.
*G06F 3/0484* (2013.01)
*G06F 3/0485* (2013.01)

(52) U.S. Cl.
CPC ........ *G06F 3/04847* (2013.01); *G06F 3/0485* (2013.01); *G06F 2203/04806* (2013.01)

(58) Field of Classification Search
CPC ............... G06F 3/04847; G06F 3/0485; G06F 3/04845; G06F 2203/04806
See application file for complete search history.

(56) References Cited

U.S. PATENT DOCUMENTS

| | | | |
|---|---|---|---|
| 5,491,781 A | 2/1996 | Gasperina | |
| 2009/0177995 A1* | 7/2009 | Gould | G06F 3/04855 715/786 |
| 2012/0308204 A1* | 12/2012 | Hwang | G06F 3/04847 386/241 |

OTHER PUBLICATIONS

Weverka, "Office 2010 All-In-One for Dummies", copyright 2010, Wiley Publishing, Inc. (Year: 2010).*

* cited by examiner

*Primary Examiner* — Kevin L Young
*Assistant Examiner* — Seth A Silverman
(74) *Attorney, Agent, or Firm* — Maginot, Moore & Beck LLP

(57) ABSTRACT

A method for determining an interval via a graphical user interface includes displaying a navigation bar. The navigation bar has a scale and a slider. The slider is configured to be movable along the scale. The scale has two handles on end faces of the slider opposite to each other longitudinally to the scale. The method further includes retaining opposite handle and adjusting the slider on the side of the dragged handle if one of the handles is dragged. The method further includes dividing the navigation bar into a core area having the slider and two edge areas if the slider falls below a predefined minimum length. The edge areas extend to both sides of the core area longitudinally to the scale and expand the scale and the slider within the core area and compressing the scale in the edge areas.

13 Claims, 3 Drawing Sheets

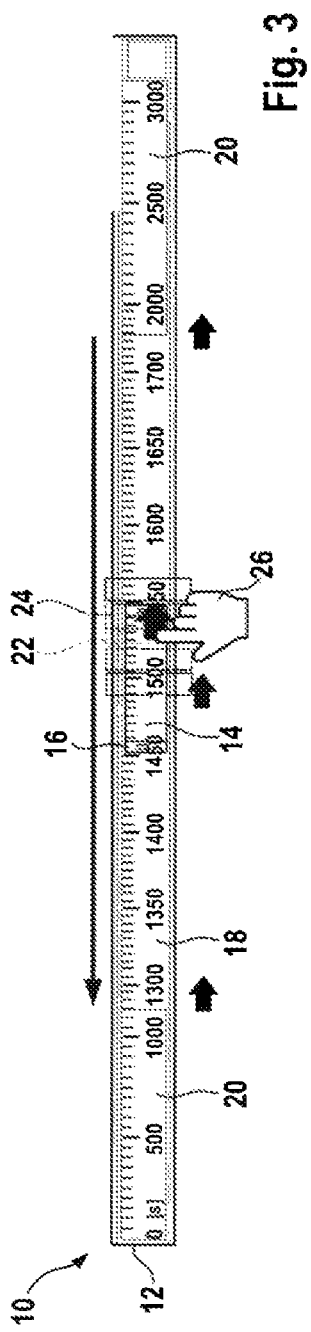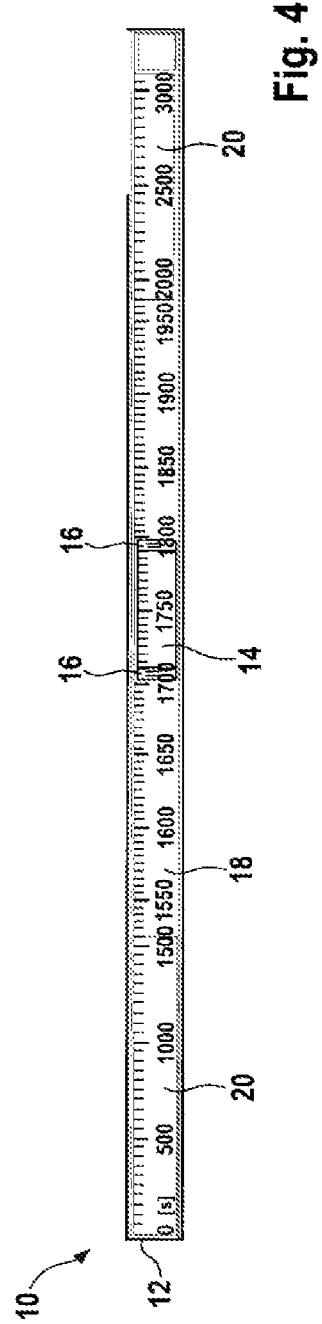

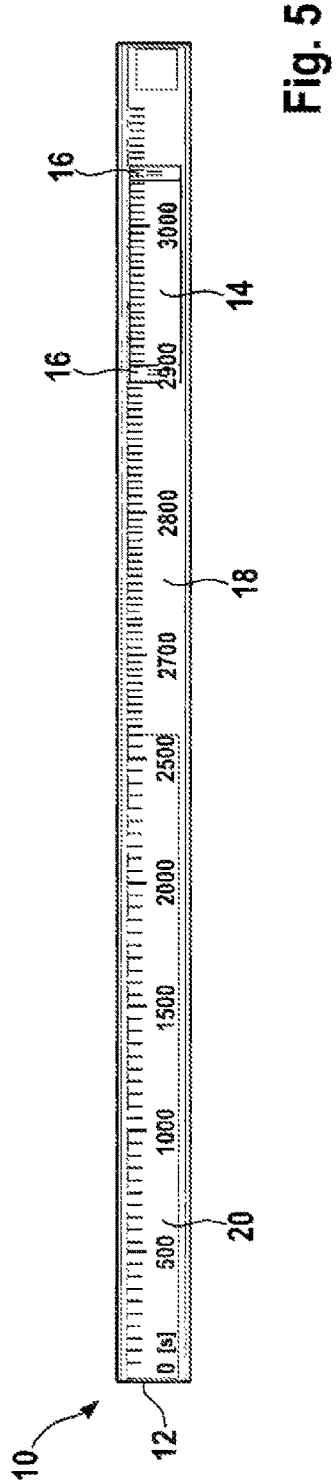
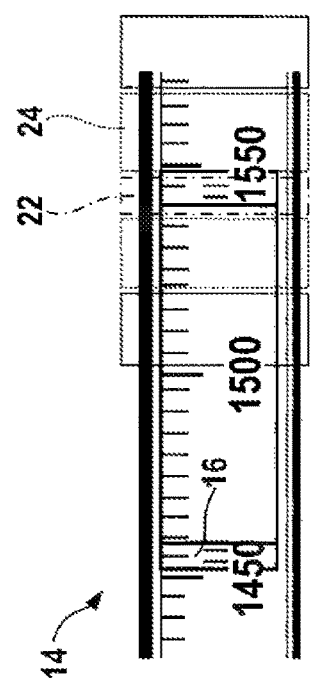

METHOD AND DEVICE FOR DETERMINING AN INTERVAL VIA A GRAPHICAL USER INTERFACE

This application claims priority under 35 U.S.C. § 119 to patent application no. DE 10 2015 208 578.3 filed on May 8, 2015 in Germany, the disclosure of which is incorporated herein by reference in its entirety.

The disclosure relates to a method for determining an interval via a graphical user interface. to In addition, the disclosure relates to a corresponding device, a corresponding computer program, and a corresponding storage medium.

BACKGROUND

In the field of software ergonomics, a graphical user interface (GUI) refers to a category of user interfaces which allows the operation of application software by means of graphical symbols, so-called control elements (widgets). In computers, the operation or selection of such control elements is generally carried out by means of a mouse or another control element; on the other hand, in smartphones, tablets, and kiosk systems, it is carried out by touching a touchscreen.

In this context, one challenge is posed by the exact selection of intervals from an extensive quantity, in particular the exact determination of a time interval via a user. Relevant application cases are known, for example, from measurement, sound, video, or medicinal technology, where it is important to depict extensive temporally structured databases in sections at virtually any temporal resolution. One conventional control element used for this purpose is known to those skilled in the art as a scrollbar or slider. According to U.S. Pat. No. 5,491,781 A, for example, a selected section of a graphical depiction is shown in a window on a screen. A slider on one side of the window is provided for changing the displayed section of the graphical depiction in response to the movement of the slider. The slider includes end sections or handles which may be dragged in order to change the size of the slider. This has the effect of changing the size and enlarging the displayed section of the graphical depiction.

SUMMARY

The disclosure provides a method for determining an interval via a graphical user interface, a corresponding device, a corresponding computer program, and a corresponding storage medium, according to the independent claims.

One advantage of this approach lies in its capability of combining the options for scrolling and zooming within one navigation bar. Particularly when it is important to single out small sections (deep zooming) from an extensive database, it is possible using this approach to maintain the operability of the slider and simultaneously to indicate the full data volume. In this case, no additional space is required outside the navigation bar which would reduce the actual data display. In addition, manipulation using only one sliding element is easier than using multiple control elements separately for zooming and navigation.

Advantageous refinements and improvements of the basic idea specified in the independent claim are possible via the measures specified in the dependent claims.

BRIEF DESCRIPTION OF THE DRAWINGS

Exemplary embodiments of the disclosure are depicted in the drawings and are described in greater detail in the following description. The following are shown:

FIG. 3 shows the navigation bar while moving the slider.

FIG. 4 shows the navigation bar after releasing the slider.

FIG. 5 shows the navigation bar in a boundary case.

FIG. 6 shows the slider while dragging a handle.

DETAILED DESCRIPTION

Figure 1:
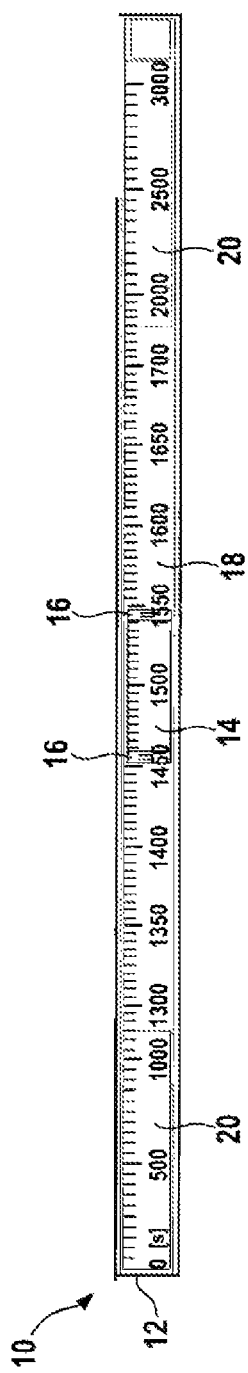
FIG. 1 shows a navigation bar according to a first specific embodiment.

FIG. 1 illustrates the basic concept of a graphical user interface according to one specific embodiment. The user interface displays a navigation bar 10 including a time scale 12 and a slider 14 which is movable along the time scale 12, which has two handles 16 on the end faces which are opposite each other longitudinally to the time scale 12. It is to be understood that that the navigation bar 10 may absolutely have a time-independent scale 12, for example, an X-Y depiction (such as rotational speed, load, pressure-volume, crankshaft pressure level) in an alternative specific embodiment, without departing from the scope of the disclosure. The time scale 12 of the disclosure is therefore to be considered to be only one possible example of a scale 12. In this case, the slider 14 is used for the visual control of a time range represented by it. When zooming in, the display changes from the normal display to the "lens view" shown in FIG. 1, in which the slider 14 is displayed on a magnified scale. The core area 18 takes up a certain portion of the total time scale 12. In order to ensure that the total time range is still shown on the time scale 12, the edge areas 20 outside the magnified core area 18 are correspondingly compressed.

Attention will now be directed to the appearance of the navigation bar 10 in lens mode.

Within the navigation bar 10, the slider 14 has a constant size at each magnification level/zoom level. To identify the magnification mode, the slider 14 has a different color than in normal mode. The core area 18 appears in normal mode and also has a constant size. The edge areas 20 are visibly different than the core area 18 since they have a different height and a somewhat smaller scale legend; in addition, the background color is different, for example, somewhat darker or gray. The boundary between the core area 18 and the edge areas 20 is indicated by a step or as a folded structure, in order to move the core area 18, so to speak, into the foreground, and the edge areas 20 into the background. Scale legends on the boundary are suppressed in order to avoid truncated numbers.

The transition from normal mode to the lens is as follows: If the user zooms in, the zooming behavior changes from normal mode to lens mode when the slider 14 has a certain size. In order to maintain the correct ratio on the user interface between the size of the slider 14 and the scale 12 in the core area 18, the scale 12 of the navigation bar 10 is correspondingly adjusted, i.e., expanded.

Figure 2:
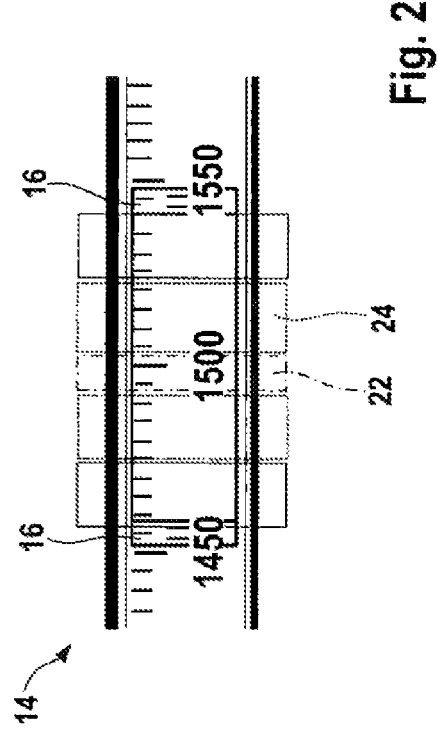
FIG. 2 shows a slider of the navigation bar.

For this purpose, the point at which the mode switches from normal mode to the lens must be defined. Preferably, this takes place as a function of a size of the slider 14 defined in pixels. With a suitable specification, the slider 14 thus remains large enough to function within the boundaries of its scrolling activities, which are described below based on FIG. 2.

In lens mode, the slider 14 remains in the center of the core area 18 as long as this is correct and possible; reference will be made here to the following embodiments. Scrolling may occur due to acceleration areas 24 within the core area 18, which represent different scrolling speed levels, and which are shown only for purposes of illustration and are not visible to the user. This position of the neutral area 22 is determined by the position at which the user clicks when starting to scroll.

For this purpose, the size of the neutral area and a possible maximum speed of scrolling must be determined. Furthermore, it is possible to conceive of multiple separated acceleration areas 24 or a linear or moderately exponential acceleration. In this case, a behavior is preferably to be supported which may be suitably felt and controlled. If required, a display for informing about the scrolling speed may be considered, for example, acceleration arrows such as forward and fast forward.

If the user clicks and holds the mouse pointer 26 in the inner area of the slider 14, this is taken to be the starting point for the determination of the scrolling speed. The more the mouse pointer 26 is moved from this neutral area 22, the faster the scrolling is carried out. FIG. 3 illustrates this behavior based on a movement of the mouse pointer 26 from the neutral area 22 into the right acceleration area 24. Following the movement of the mouse pointer 26, the core area 18 and the slider 14 move in the same direction, while the magnified scale 12 having the information visible on it moves in the opposite direction through the core area 18, i.e., to the left according to the illustration. The speed of the movement of the core area 18 and the slider 14 occurs at a slower speed corresponding to the zoom level, which is measured in such a way that the position of the slider 14 relative to the total time range is accurately depicted at any time. If the mouse pointer 26 is removed or moved back into the area 22, the scrolling ends, as shown in FIG. 4.

The boundary cases when scrolling in a magnified depiction indicated in FIG. 5 should be noted. If the core area 18 reaches the MIN or MAX value on the time scale 12, the edge area 20 on this side of the navigation bar 10 vanishes. Scrolling then results in a movement of the slider 14 until the MIN or MAX value has been reached on the time scale 12 and no additional scrolling is possible by means of the slider 14.

In order to allow high-speed scrolling, for example, a very rapid movement across the total time range of the navigation bar 10, across the core area 18, the latter may be dragged outside the slider 14. The movement of the dragged mouse to the left or right then results in a movement of the core area 18 across the navigation bar 10. In this case, the speed of the scrolling is a function of the speed of the mouse movement, as in the normal scrolling mode by means of the slider 14. If the core area 18 reaches the left or right boundary of the navigation bar 10, no further movement of the core area 18 is able to occur.

Finally, zooming in a magnified depiction will be discussed with reference to FIG. 6. The left and right handles 16 of the slider 14 are used for zooming. As in the case of scrolling, the position of the mouse pointer 26 relative to each handle 16 is used to determine the speed of the zooming. The main difference is that for zooming, the neutral area 22 is defined by the left or right handle 16 of the slider 14. The greater the distance between the relevant handle 16 and the mouse pointer 26, the faster the zooming is carried out. Zooming ends if the mouse pointer 26 is either released or is again in the neutral area 22.

In this case, zooming in a magnified depiction exhibits the following behavior: When zooming in, the scale 12 in the core area 18 is continuously expanded; when zooming out, it is compressed. The edge areas 20 of the navigation bar 10 are correspondingly adjusted. In this case, the size of the core area 18 remains the same. The position of the slider 14 remains in the center of the core area 18 as long as possible. Any maximum value for the zoom speed should be suitably determined.

When zooming in as well, possible boundary cases should be noted. Technical limitations may thus limit zooming in, if, for example, the data type of the time slot is limited to nanoseconds. An additional limitation could, for example, be determined as a function of the available data points of the random sample, but does not necessarily have to be detected by the navigation bar 10.

When zooming in in magnified mode, the core area 18 may reach the left or right edge of the navigation bar 10. Zooming in then results in a movement of the slider 14 in the direction of each edge. As always when zooming in, the magnification ratio in the core area 18 is continuously compressed in order to keep the size of the slider 14 unchanged. This compression ends if either the slider 14 reaches the edge of the navigation bar 10 or the magnification ratio is 1, i.e., as described below during normal zooming.

The transition from the lens to the normal depiction is as follows: When zooming out, the lens functionality is stopped if the scale 12 within the core area 18 is equal to that in the edge areas 20, i.e., the magnification ratio is 1. The edge areas 20 are then again shown in the normal depiction, and zooming results in a change in the size of the slider 14.

What is claimed is:

1. A method for determining an interval via a graphical user interface, comprising:
   displaying a navigation bar using the user interface, the navigation bar including a scale and a slider, the slider being configured to be movable along the scale, the slider having two handles arranged on each end of the slider and opposite to each other longitudinally to the scale;
   in response to one of the two handles of the slider being dragged, (i) retaining a position of the opposite handle of the slider using the user interface and (ii) adjusting a length of the slider on a side of the dragged handle using the user interface; and
   in response to the length of the slider falling below a predefined minimum length, (i) dividing the navigation bar into a core area that includes the slider and two edge areas that each extend from one end of the navigation bar to one side of the core area using the user interface, (ii) expanding the scale and the slider within the core area using the user interface, and (iii) compressing the scale in the two edge areas using the user interface.

2. The method according to claim 1, further comprising:
   displaying the navigation bar with a first color combination using the user interface before the slider falls below the minimum length; and
   in response to the length of the slider falling below a predefined minimum length, displaying the core area with the first color combination and the two edge areas in an additional color using the user interface.

3. The method according to claim 1, further comprising:
   dividing the navigation bar using the user interface such that that the slider is in the center of the core area; and after the division, in response to the slider being moved or one of the two handles being dragged, adjusting the core area and the two edge areas with the slider using the user interface.

4. The method according to claim 1, further comprising:
in response to the slider being moved, dividing the slider using the user interface into (i) a neutral area surrounding a pointer and (ii) at least a first acceleration area,
wherein the first acceleration area extends longitudinally to the scale on both sides of the neutral area,
wherein the user interface includes the pointer for moving the slider,
wherein the moving of the slider includes picking up the slider using the pointer, moving the pointer, and releasing the slider,
wherein the slider is moved if the slider is picked up and the pointer is present in the first acceleration area, and
wherein the moving of the slider is accelerated if the pointer is present in a second acceleration area.

5. The method according to claim 4, further comprising:
in response to the slider being picked up, further dividing the slider using the user interface into the second acceleration area in addition to the neutral area and the first acceleration area,
wherein the second acceleration area extends longitudinally to the scale on both sides of the first acceleration area, and
wherein the slider is accelerated if the pointer is moved from the first acceleration area into the second acceleration area.

6. The method according to claim 5, further comprising:
in response to the slider being picked up, accelerating the slider using the user interface in a constantly increasing linear manner to a distance of the slider from the neutral area.

7. The method according to claim 1, further comprising:
displaying a section of a temporally ordered depiction related to the interval using the user interface, wherein the interval is a time interval; and
in response to the slider being moved or one of the two handles being dragged, adjusting the section with the slider using the user interface.

8. The method according to claim 7, wherein the depiction is an oscillogram.

9. The method according to claim 1, further comprising:
displaying a section of a map display related to the interval using the user interface, wherein the interval is a time or distance interval; and
in response to the slider being moved or one of the two handles being dragged, adjusting the section with the slider using the user interface.

10. The method according to claim 1, further comprising:
displaying an additional navigation bar using the user interface, wherein the additional navigation bar is arranged at a right angle to the navigation bar and the additional navigation bar is configured to determine an additional interval;
displaying a section of an X-Y depiction related to the interval and the additional interval using the user interface; and
in response to the slider being moved or one of the two handles being dragged, adjusting the section with the slider using the user interface.

11. The method according to claim 1, further comprising:
in response to one of the two handles being dragged while a control key of the user interface is pressed or a right mouse key of the user interface is activated, (i) moving both of the two handles equally in opposite directions using the user interface and (ii) symmetrically adjusting the slider using the user interface.

12. A computer program stored on a non-transitory machine-readable storage medium and configured to execute a method, the method comprising:
displaying a navigation bar using the user interface, the navigation bar including a scale and a slider, the slider being configured to be movable along the scale, the slider having two handles arranged on each end of the slider and opposite to each other longitudinally to the scale;
in response to one of the two handles of the slider being dragged, (i) retaining a position of the opposite handle of the slider using the user interface and (ii) adjusting a length of the slider on a side of the dragged handle using the user interface; and
in response to the length of the slider falling below a predefined minimum length, (i) dividing the navigation bar into a core area that includes the slider and two edge areas that each extend from one end of the navigation bar to one side of the core area using the user interface, (ii) expanding the scale and the slider within the core area using the user interface, and (iii) compressing the scale in the two edge areas using the user interface.

13. A device configured to carry out a method, the method comprising:
displaying a navigation bar using the user interface, the navigation bar including a scale and a slider, the slider being configured to be movable along the scale, the slider having two handles arranged on each end of the slider and opposite to each other longitudinally to the scale;
in response to one of the two handles of the slider being dragged, (i) retaining a position of the opposite handle of the slider using the user interface and (ii) adjusting a length of the slider on a side of the dragged handle using the user interface; and
in response to the length of the slider falling below a predefined minimum length, (i) dividing the navigation bar into a core area that includes the slider and two edge areas that each extend from one end of the navigation bar to one side of the core area using the user interface, (ii) expanding the scale and the slider within the core area using the user interface, and (iii) compressing the scale in the two edge areas using the user interface.

* * * * *